May 12, 1936.  A. RAVA  2,040,215
METHOD OF MAKING REFRACTORY MATERIALS
Filed May 15, 1933   2 Sheets-Sheet 1
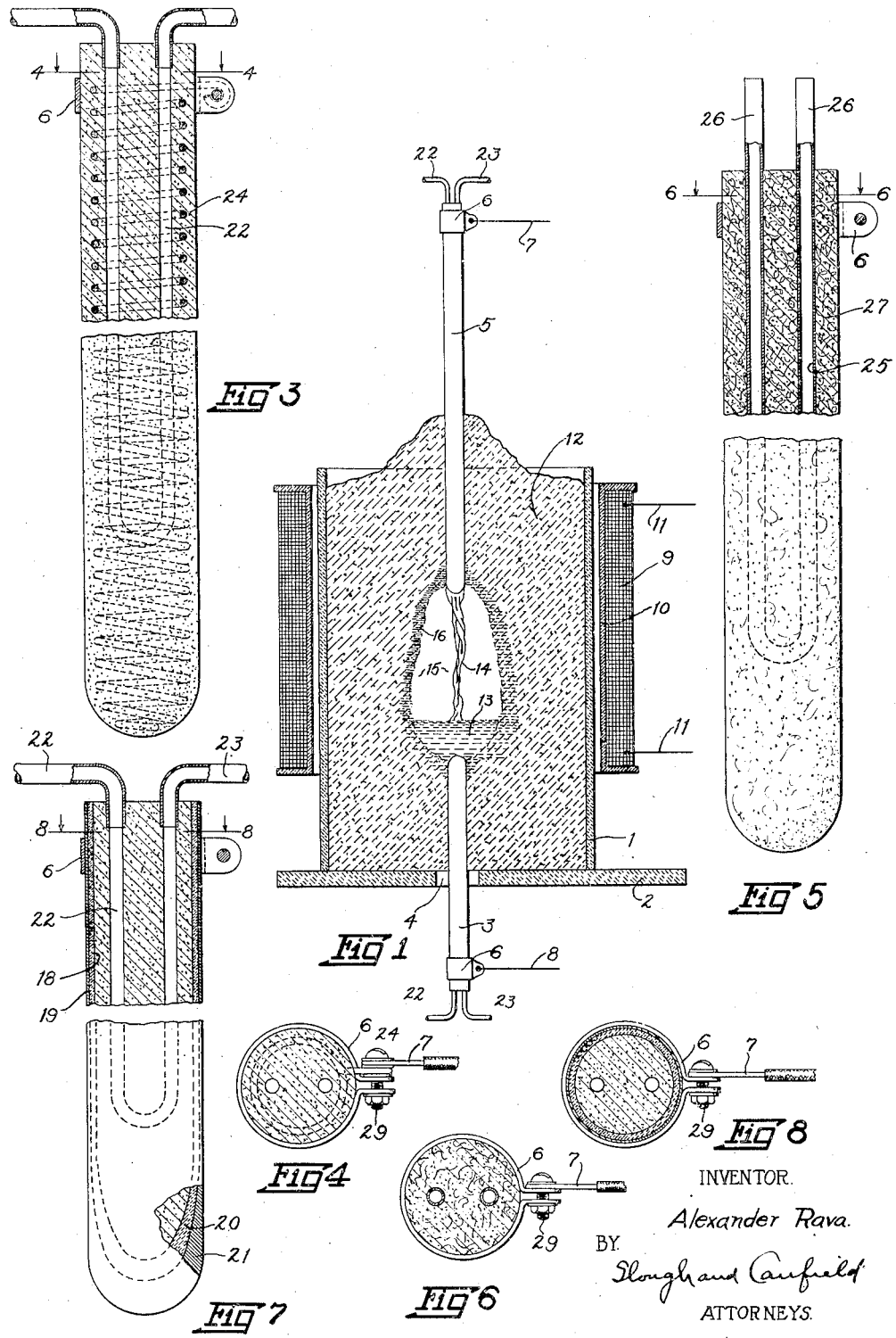
INVENTOR.
Alexander Rava.
BY
Sloughand Canfield
ATTORNEYS.

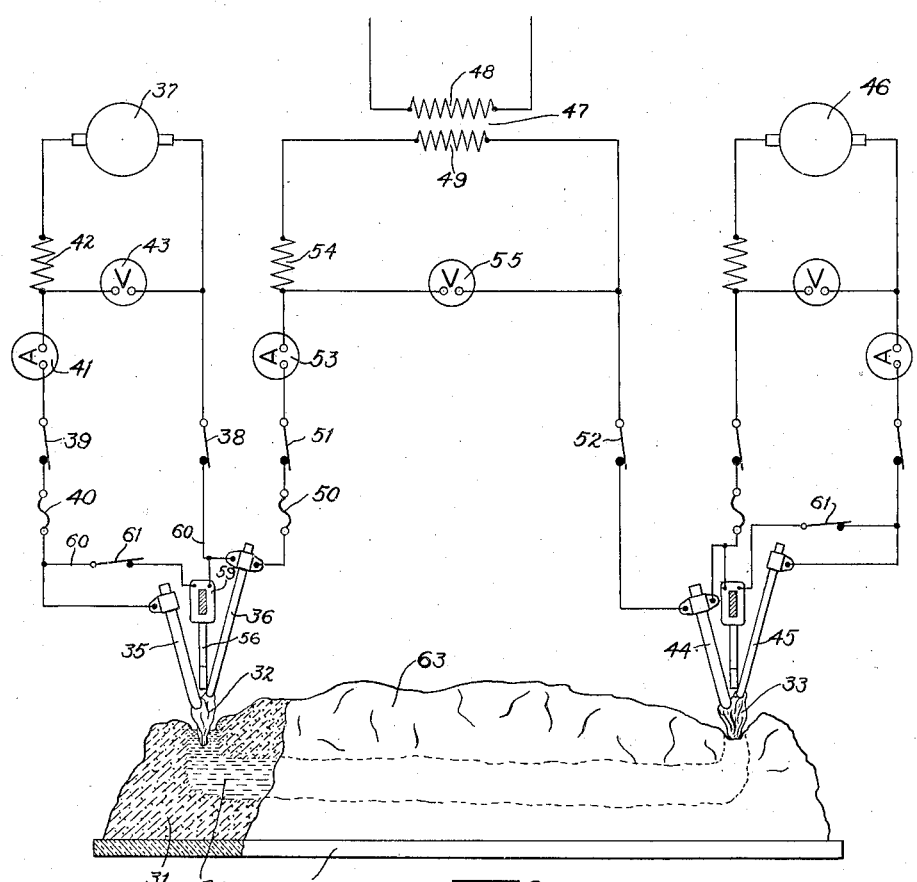
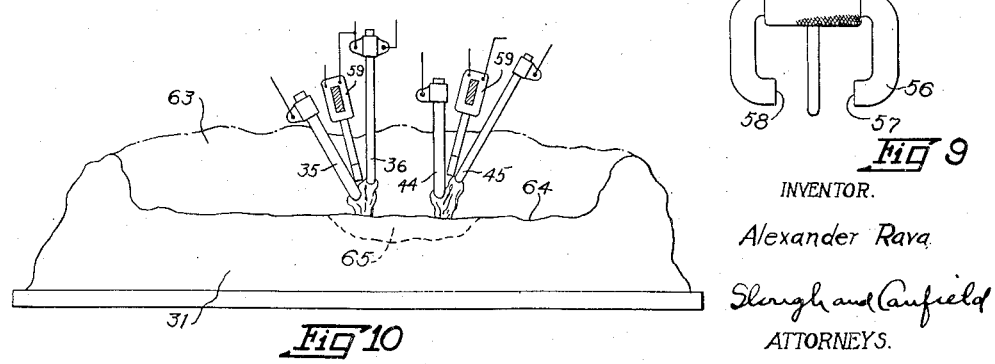
INVENTOR.
Alexander Rava
Slough and Canfield
ATTORNEYS.

Patented May 12, 1936

2,040,215

UNITED STATES PATENT OFFICE 2,040,215

METHOD OF MAKING REFRACTORY MATERIALS

Alexander Rava, Chicago, Ill.

Application May 15, 1933, Serial No. 671,148

12 Claims. (Cl. 13—36)

This invention relates to refractory materials and to the methods and means of producing them.

In the various arts and for various purposes, high temperatures of the order of 1000° C. to 1500° C. have been employed for some time, and as technical and chemical developments proceed there is a distinct growing tendency to introduce still higher temperatures, for example of the order of 1500° C. to 2500° C. Such higher temperatures offer advantages in many old technical and chemical applications and lead the way to important improvements and discoveries in processes and products in the various metallurgical, chemical, ceramic, internal combustion engineering and other arts.

In many of the uses and applications of high temperatures, it is necessary to employ refractory materials, and refractory materials which have heretofore been available have softening, deformation, melting and disassociation temperatures in the vicinity of 2000° C. Some of the high temperature refractories heretofore proposed containing or utilizing carbon, tungsten and other ingredients which render them capable of withstanding the high temperature, are, because of their composition, chemically too active or require that they be used in special surrounding atmosphere.

There remain, therefore, only a few oxides, carbides and nitrides having exceedingly high melting points which are suitable for utilization in refractory material at temperatures of 2000° C. and higher.

Because of qualities discussed hereinafter and because of its comparative availability, the most desirable refractory material is zirconium dioxide. There are other oxides, and there are carbides and nitrides which have high melting points and in this respect would be suitable as refractories, but they have too high a rate of evaporation at the high temperatures employed; or are not sufficiently strong mechanically; or are too brittle and porous after being fused into refractory ware or other forms; or are too readily disassociated into their constituent elements; or require special atmospheres, such as hydrogen, carbon monoxide or dioxide, nitrogen, etc.; or, again, are too expensive.

Zirconium dioxide has heretofore been employed in the production of refractories, such as refractory ware, but such zirconium dioxide ware, sometimes referred to as zirconia ware, develops a fragility at certain temperatures the cause of which has not heretofore been fully explained, and which naturally results in the limitation of the use of such ware to a comparatively few occasional instances in a few only of the arts.

It is therefore an object of this invention to provide an improved refractory material for use in the various arts.

Another object is to provide an improved refractory material for use at temperatures of the order of 2000° C. and higher.

Another object is to provide an improved zirconium dioxide refractory material.

Another object is to provide a method and means for producing an improved zirconium dioxide refractory material.

Another object is to provide an improved method and means for producing refractory material.

Another object is to provide an improved method and means for producing refractory material by the application of electrical heat.

Another object is to provide an improved method and means for fusing and/or melting highly refractory material.

Another object is to provide an improved method and means for applying the electric arc to the fusing and/or melting of refractory material.

Another object is to provide an improved process for utilizing the natural interior molecular arrangement of specified mixed ingredients of refractory component materials in the production of a refractory material.

Another object is to provide an improved method and means for fusing and/or melting together a plurality of component materials into a refractory material suitable for use in the various arts.

Another object is to provide an improved method and means for producing refractory material comprising zirconium dioxide as a base mixed with other highly refractory components.

Another object is to provide an improved electric furnace for fusing and/or melting refractory material.

Another object is to provide an improved electric arc electrode for electric furnaces and the like.

Another object is to provide an improved method and means for melting refractory material at exceedingly high temperatures without the introduction thereinto of impurities.

Other objects will be apparent to those skilled in the art to which my invention appertains.

My invention is fully disclosed in the following description taken in connection with the accompanying drawings, in which:

Fig. 1 is a cross-sectional view of an apparatus which I may employ in the practice of my invention by one method;

Fig. 2 is a view partly diagrammatic and comprising elements of apparatus partly in cross-section illustrating another mode of practicing my invention;

Fig. 3 is a view illustrating separately an electrode forming part of Fig. 1, the view being to an enlarged scale and partly in longitudinal section;

Fig. 4 is a cross-sectional view taken from the plane 4—4 of Fig. 3;

Fig. 5 is a view similar to Fig. 3 illustrating another form of electrode which I may employ;

Fig. 6 is a cross-sectional view taken from the plane 6—6 of Fig. 5;

Fig. 7 is a view similar to Fig. 3 illustrating still another form of electrode which I may employ;

Fig. 8 is a sectional view taken from the plane 8—8 of Fig. 7;

Fig. 9 is a fragmentary view of an electro-magnet of Fig. 2, the view being taken from the direction at a right angle to that of Fig. 2;

Fig. 10 is a view similar to Fig. 2 illustrating some of the parts in different positions.

As will hereinafter become more apparent, the refractory material produced by the practice of my invention is made by mixing with zirconium dioxide other refractory oxides such as magnesium oxide, calcium oxide, etc., to be more fully referred to, and then applying heat of the electric arc and electric current to melt these oxides together to produce the refractory material which may then be utilized in the manufacture of ware and other refractory forms.

It is important, however, in the practice of my invention to understand certain underlying principles which will now be set forth.

As stated hereinbefore, zirconium dioxide has been sintered and formed into refractory ware known as zirconia ware, but that such ware is subject to a marked fragility at certain temperatures.

It has been found, that upon heating and subsequently cooling zirconia ware, its crystalline or molecular structure goes through a succession of changes. By a series of careful dilatometric measurements at various elevated temperatures it has been found, that zirconia ware made from zirconium dioxide, when heated to about 1000° C. has a fairly uniform thermal expansion. At a 1000° C. to 1100° C., with the temperature mounting, there occurs, however, a rather sudden drop in the rate of expansion and a subsequent stop of expansion with a following contraction, which, on cooling, is followed again, between 1000° C. and 800° C. (under cooling) by a more or less sudden expansion, with a rate somewhat similar to the previous one for the particular temperature range. An analogous reversible phenomenon, somewhat less pronounced, occurs also at higher temperature thresholds, 1800° C. to 1900° C. with even greater under cooling.

This is the reason for the cracking, crumbling, spalling and general unreliability of zirconia ware, or ware made from zirconium dioxide. Determinations of the crystalline molecular structures of zirconium dioxide ware obtained at various elevated temperatures by means of the X-ray diffraction method give the full picture of the changes in molecular structure.

The discoveries that the solids belonging to the crystalline state of matter show marked directional preferences in respect to their physical and chemical properties and possess a more or less sharply defined melting point, the change into liquid condition or state being accompanied by heat absorption, the other solids again of the amorphous state of matter do not show any of these hereinbefore mentioned directional preferences, do not possess a well defined melting point and upon heating gradually lose their rigidity, finally becoming rather mobil fluids, has led to the belief that the crystalline solids constitute an agglomeration of unit molecular cells with definite symmetrical arrangements. This, in fact was entirely substantiated and justified by the discovery of the X-ray diffraction patterns. The molecular crystals being nearly of the same dimensional order as the "white" or monochromatic X-ray wavelengths, act for the latter as three-dimensional optical gratings. Furthermore, these X-ray diffraction methods made possible a fairly exact determination not only of the type of the crystalline structures of the unit molecular cells, but also of their dimensions, ionic radii and the density of the substances as well.

Most of the crystalline solids occur always in the same or very nearly the same crystalline form. There are a number of substances, however, which are polymorphous, that is, they occur in more than one crystalline form.

Zirconium dioxide belongs to this last group, its crystalline molecular structure, 4 molecules per cell, changing according to thermal conditions. Thus, at temperatures ranging up to 1000° C., it has a monoclinic structure with unit cell axes: $a=5.19$ Angstrom units, $b=5.21$ A. U., $c=5.37$ A. U. and angle $\beta=80°32'$, which gives us a volume of the unit cell $V=145.16$ cubic A. U. and calculated density $D=5.54$.

Above 1000° C. this monoclinic structure of zirconium dioxide changes into a tetragonal one with: $a=5.07$ A. U., $c=5.16$ A. U. and density $D=6.10$.

An extended heat treatment at temperatures above 1900° C. produces again a major change in the structure of zirconium dioxide, into a modified tetragonal closed-packed lattice with $a=3.598$ A. U., $c=1.633$ and density $D=6.13$.

The two first mentioned crystalline forms are stable only in their characteristic temperature ranges, and, although subject sometimes to considerable undercoolings, are of reversible nature, which undoubtedly is the cause of the contractions and expansions with the ultimate cracking previously mentioned.

The third form is more stable. It cannot be preserved entirely unmodified on cooling to the room temperature, since some changes seem to occur below 700° C. However, the material does not revert fully to the tetragonal, nor to the monoclinic structures, and the change is more gentle, although even at that it might cause an increased fragility of the ware.

I have deduced, from the above facts showing the thermal instability of the zirconium dioxide crystalline molecular structure, that the necessary criteria for a reliable, thermally stable, zirconium dioxide refractory are: to eliminate or prevent the above described changes in the crystalline structure inherent to zirconium dioxide for the entire useful temperature range, and to fire the zirconium dioxide at a temperature above 2000° C. for a substantial length of time, actual melting being preferable, bearing in mind that the actual melting temperature of zirconium dioxide alone is approximately 2700° C.

In order to prevent the change in crystalline form of the zirconium dioxide, and to render it thermally isomorphous, I combine it with other substances to produce mix-crystalline structures of the desired stability.

The main requirement, in general, for the formation of such zirconium dioxide compounds is, that the unit cell forms and volumes, and the ionic radii of the components shall not be very different from those of zirconium dioxide, in order that the molecules of the component substances may fit into or around the crystal lattices of the zirconium dioxide. However, when the substances are subjected to a melting temperature, it seems that only the first condition is of primary importance, that is, that the unit cell forms of the component substances mixed with the zirconium dioxide shall not differ much from those of the latter.

It is, furthermore, highly desirable in forming the mix-crystalline structures to thoroughly mix the components and this may best be done in a liquid state, since then the proper interaction among the components may more easily take place to the fullest extent.

Therefore, in complying fully with the criteria above established, I compound the refractory materials with zirconium dioxide base as described below, by subjecting them to a fusing and melting operation in an oxidizing atmosphere. By this means I derive in addition another highly desirable and important advantage, namely the increasing of the density of the material to the utmost possible degree, thus preventing excess shrinkage of the manufactured refractory ware or the like.

Furthermore, during the fusion and melting, a part of the bulk of the material is converted into a "glass", that is, a vitrified substance of decidedly amorphous structure, which acts in any further processing, such as the production of refractory ware or the like of various shapes, as an efficient fluxing and binding agent. This "glassy" substance softens and gradually flows, as amorphous solids generally do, during any subsequent sintering operations, without any sharply defined melting point, but within a temperature range substantially lower, than when in the crystalline state. It thus helps to cement together the series of mix-crystals of which the major part of the bulk of the material still consists.

By extended investigations I have found that the desired thermally stable mix-crystalline formations with zirconium dioxide base can be obtained only with the additions of other highly refractory oxides which possess a cubic crystalline structure of their own molecular cells. Only this class of oxides gives with zirconium dioxide, to the fullest extent especially after fusion and melting, a series of thermally stable mix-crystal molecular aggregational arrangements (zirconates) of a generally cubic type.

The explanation is, that the thermally polymorphous crystalline forms of zirconium dioxide resemble closely a cubic lattice structure, the resemblance to such a structure being more complete the higher the firing temperature above 2000° C., and being closest on fusion. This tendency to approach the cubic lattice form with increasing temperature, reaching its culmination during fusion and melting, causes the molecules of zirconium dioxide to respond readily to the "urgings" of the cubic crystals of the admixed oxides, obligingly following the most "gentle invitations" and ultimately forming mix-crystal series of cubic form.

In accordance with the foregoing, I select as admixtures to zirconium dioxide the refractory oxides listed below, which I employ as either single additions, or in combinations of two, three or more. I employ the following oxides in preference to carbides and nitrides having high melting points, because of the instability of the latter in oxidizing atmosphere, as well as because of their adverse chemical actions upon zirconium dioxide.

The list of oxides which I prefer to use as admixtures with zirconium dioxide are:

1. Magnesium oxide
2. Calcium oxide
3. Strontium oxide
4. Barium oxide
5. Scandium oxide
6. Cerium oxide
7. Thorium oxide
8. Yttrium oxide I have employed all of these oxides either as single additions to zirconium dioxide in proportions ranging from 1.5 to 10 percent by weight thereof; and have employed more than one of the oxides, up to three and more thereof, each in proportions ranging from 1.5 to 10 percent by weight in proportion to the zirconium dioxide. In each case, after the melting and fusing operation, which will be more fully described hereinafter, the desired series of thermally stable mix-crystal molecular formations are produced, imbedded in the "glassy" (amorphous) matrix or binder, the singular importance of which has already been emphasized.

There are other refractory oxides, which may be employed as admixtures with zirconium oxide, although considerably less suitable. They are: aluminum oxide, lanthanum oxide, beryllium oxide, chromium oxide, and vanadium oxide.

As illustrative of the suitability of the first named eight oxides, their crystalline structures may be briefly outlined. The magnesium oxide, calcium oxide, strontium oxide and thorium oxide are of the cubic face-centered lattice form, having the axis $a$ respectively 4.205, 4.802, 5.145 and 5.57; and the scandium oxide, barium oxide, cerium oxide and yttrium oxide being of the cubic type having the axis $a$ respectively 9.79, 5.5, 5.41 and 10.56, the measurements given being, as before herein, in Angstrom units.

In combining the said preferred oxides with zirconium dioxide and in forming therefrom refractory material, by the method and means to be more fully described, the zirconium dioxide and each of the oxides mixed therewith are first fused separately to overcome the volatility of the raw state. After fusing, the components are crushed and/or pulverized; after removal of impurities, which might enter the bulk during these last mechanical operations, the components are thoroughly mixed and then subjected to the fusing and melting process to reduce them to the ultimate refractory material.

Besides the above-mentioned advantage of producing a thermally stable molecular formation by the addition to zirconium dioxide of selected oxides, other advantages result when two, three or more of the component oxides are mixed with zirconium dioxide, each in the proportion of 1.5 to 10 percent by weight of zirconium dioxide.

These advantages are, first, the furthering of the compactness of the fused mass obtained and, hence, the density of the resultant ware, or other refractory article made therefrom, since a greater variety of mix-crystal formations are now packed closely together; second, the checking of the volatility of the components, for example, magnesium oxide present as zirconate by calcium oxide-zirconate; third, the increasing to various extents of the vitrious or amorphous content of the melts; and fourth, the facilitating of the subsequent glazing of the surface of the shaped refractory ware or the like where this is desirable.

To still more facilitate the glazing of the surfaces of the refractory ware, small additions such as 1 to 5 percent by weight of either ceria, thoria or yttria, or combinations of them may be added. I employ these components therefore in cases, when a thorough glazing is to be effected.

In the practice of making my improved refractories I may employ the apparatus illustrated in Fig. 1.

A hollow cylindrical shell 1 made from suitable refractory material, such as fire clay, is supported vertically upon a base 2, also of refractory material. A lower electrode 3 is projected upwardly through a suitable perforation 4 in the base 2 and into the cylinder 1, and an upper electrode 5 is projected downwardly into the upper end of the cylinder, the inner ends of the electrodes being in contact at the time of starting the process.

The electrodes 3 and 5 are provided with terminals 6—6 clamped thereupon and conducting wires 7 and 8 are connected to the terminals and to a supply of alternating current of at least 60 cycles per second frequency. Higher frequencies may be employed if convenient. Lower frequencies are not desirable because of the deteriorating effect upon the inner arc ends or tips of the electrodes.

A direct current electro-magnetic winding 9, preferably wound upon a spool 10 of insulating material, is telescoped over the outside of the cylinder 1 and extends axially over the greater portion of the cylinder, and the terminals 11—11 of the winding are connected to a source of direct current to produce a constant magnetic field within the cylinder 1, the direction of which is parallel to the axis of the cylinder.

The cylinder 1 is packed full of powdered or granulated zirconium dioxide or zirconium dioxide compound, as indicated at 12. The compound is produced as hereinbefore described, by first fusing and then pulverizing separately zirconium dioxide and one, two, three or more of the preferred oxides listed above and then mixing these oxides with the zirconium dioxide in the proportions from 1.5 to 10 percent by weight of zirconium dioxide. When the compound 12 is packed in the cylinder 1, the inner ends of the electrodes are in contact. When the alternating current circuit is completed through the electrodes at a voltage of 30 to 50 volts, the upper electrode is gradually withdrawn, striking an arc between the electrodes within the mass of the compound; the voltage also being gradually increased. The upper electrode is withdrawn the maximum possible distance, which will be found to be 8 to 12 inches or more at a voltage ranging up to 250 volts and more, the great length of the arc, which, as will be apparent, is far in excess of that possible in open air, is made possible by the highly ionized atmosphere created within the enclosed mass of compound by the arc immediately after being struck. The great length of arc employed causes the electrodes to be less effected thereby than by shorter arcs.

The arc melts and fuses the compound in the vicinity thereof and, shortly after the formation of the arc, the melted compound will accumulate around the tip of the lower electrode and completely immerse it in a pool 13 of the melted compound, the pool itself being highly electrically conductive due to its high temperature, and now carries the current through its mass. The intense heat of the arc 14, which now extends upwardly from the pool 13 to the upper electrode 5, melts the compound in its vicinity forming a cavity 15 within the body of the compound, the wall of the cavity as at 16 melting and flowing into the pool 13. The fusing and/or melting of the cavity wall renders it conductive and some of the current flows therethrough, the heat thereof supplementing the heat of the arc in melting more of the cavity wall. After the process is discontinued, the pool 13 will solidify and it, together with portions of the inner wall of the cavity 16, constitute a recoverable quantity of the zirconia compound of my invention.

The arc 14 or flame arc exists in the continuous magnetic field produced by the winding 8 and the alternating current in the arc, reacting upon the field, causes the arc to perpetually shift and change its position, thus excluding the possibility, that the arc may "burn in" on some preferred spot of the tip of the upper electrode, and thus further insuring, that the compound in the neighborhood of the cavity 15 will be uniformly heated, fused and melted. The upper electrode does not become ever much exposed during the melting operation, because of the gradual creeping and sagging due to its own weight, of the upper portion of the loosely piled up powdered or granulated material 12; the latter has to be added from time to time as the melting process progresses.

In Figs. 3 to 8 inclusive I have illustrated forms of electrodes which may be employed to advantage. These electrodes are preferably of 1½" to 2½" or more in diameter and cylindrically shaped with rounded inner ends, or tips. In the form Figs. 7 and 8, a cylindrical graphite or carbon rod is first formed, grooved and roughened on the surface, which is covered first with zirconium carbide glaze 18. The glaze, in turn, is covered with a dense and strongly adhering deposit of pure zirconium metal 19. Such layer of zirconium metal may be effectively formed by a thermal decomposition of a suitable gaseous zirconium compound such as oxychloride, or tetraiodide, into which the glazed rods are projected, being at the same time heated inductively, or by means of an electric current passed therethrough, or by other suitable means.

The glaze 18 and metal layer 19 are preferably made thicker at the tips as shown at 20 and 21.

The electrode of Fig. 7 may be provided with an interior channel 22 in order to facilitate the escape of enclosed gases during their processing, such as heating to glaze them and coat them with metal, and also during their actual use as electrodes. Furthermore, if desired, the channel 22 may be utilized to cool the electrode in use by connecting thereto inflow and outflow pipes 22 and 23, through which a stream of cold air or, by outfitting the channel with a metal pipe, a circulating forced stream of cold water may be pumped.

In Figs. 3 and 4 I have illustrated another form of electrode. In this form the body proper of the rod is made from highly compressed and pre-fired zirconium dioxide, or any one of the zirconia compounds hereinbefore described, bonded with a suitable binder such as boro-glycerin and, if desired, a quantity of finely powdered zirconium metal may be incorporated therein. In this rod a spiral wire 24 of zirconium metal is imbedded which serves as a conductor for the electric current in the cooler portions of the electrode which, because of the zirconium dioxide therein might have sufficient electrical insulating property to interfere with the flow of current. In this connection it may be noted that pure zirconium dioxide is substantially an insulator at temperatures below 1600° C. and others of the zirconia compounds, described above, may be insulators at various other in some cases even higher temperatures.

In this form also the circulating and ventilating channel 22 may be employed. The spiral zirconium wire or ribbon 24 is, adjacent the upper end of the electrodes, brought out and joined to the terminal 6 as shown in Figs. 3 and 4.

In the form of electrode shown in Figs. 5 and 6, the body of the electrode may be made, as described for the form of Fig. 3, from zirconium dioxide, or zirconium dioxide compounds, and suitable binders. In this form a zirconium metal pipe 25 extends axially into the electrodes to serve both as a cooling conduit, through which a cooling medium, such as water, may be rapidly circulated by pipe connections to upper extremities 26—26 of the pipe; and the pipe 25 may also serve as the principal conductor for the electric current flowing through the electrode. To further facilitate the flow of the current and reduce the resistance of the electrodes, particularly in the cooler portions thereof, a quantity of fine zirconium metal wire wool indicated generally at 27 may be distributed through the body of the electrode and arranged to make metallic contact with the central conducting pipe 25. The wire wool also serves as an additionally efficient mechanical bond for the rod material.

In each of the forms of Figs. 3 to 8, the terminal 6 may be in the form of a flat metal band bent around the body of the electrode and clamped thereon by a screw 29 in a well known manner.

In the form of electrode of Fig. 7, the metal coating 21 at the tip of the electrode will cause the arc to form readily. In the forms of electrodes of Figs. 3 and 5, before starting the arc, a small quantity of powdered zirconium metal may first be placed between the electrode tips and to start the arc an auxiliary high frequency discharge may be applied to the electrodes at high voltage such as 20,000 to 40,000 volts. This has the effect of igniting the power on the electrode tips and heating the electrode tips to a high temperature, whereupon the main alternating current arc between the tips may be readily started.

In Fig. 2 I have illustrated another apparatus for fusing and melting zirconium dioxide and the compounds thereof described hereinbefore. In this method and apparatus I employ the principle, that highly ionized flames are efficient conductors of electric current, their ion content and therefore their conductivity increasing with temperature. In utilizing this principle, I establish direct current flame arcs and project through the flames alternating electric current in the form of flame arcs, and direct the resulting exceedingly high temperature flames upon the zirconium dioxide, or compound thereof, to be fused and melted.

Referring to Fig. 2 I show at 30 a base of refractory material upon which is piled a mass or body 31 of pulverized, or granulated, zirconium dioxide, or one of the compounds thereof above described. At 32 and 33 are indicated the flame arcs produced in a manner presently to be described, the alternating electric current, producing the arcs, flowing through the mass of material 31 and, together with the heat of the arcs, fusing and melting the material as at 34 into an elongated pool, which itself is conductive and heats and melts adjacent portions of the material. At the end of the process the melted pool is allowed to harden and is recovered and pulverized for use in the manufacture of ware.

At 35 and 36 is a pair of electrodes supported so as to dispose their lower or tip ends adjacent each other. The showing of Fig. 2 is, in some respects, diagrammatic inasmuch as elements thereof, which will be referred to, are well known in the art and need not be shown or described in complete detail. Any suitable means may be provided to support the electrodes 35 and 36 in the position illustrated and permitting the tips to be engaged and then drawn apart to strike an arc therebetween in a well known manner.

The electrodes 35 and 36 are connected in a circuit comprising a direct current generator 37, switches 38 and 39, a fuse 40, an ammeter 41 and a stabilizing resistance unit 42. A volt meter 43 may be provided if desired. Upon engaging the tips of the electrodes 35 and 36, current will flow therethrough from the generator 37 and upon withdrawing the tips an arc will be struck therebetween.

At 44 and 45 is another pair of electrodes similar to the electrodes 35 and 36 and a second direct current generator 46 is provided for supplying them with current through a circuit similar to that described for the electrodes 35 and 36.

At 47 is a transformer having a primary 47 energized from a suitable source of alternating current, such as a single phase generator provided with proper voltage regulating means, or a power line equipped with an induction voltage regulator, and a secondary 49 connected between the electrodes 36 and 44 through a fuse 50, switches 51 and 52, an ammeter 53 and a stabilizing resistance unit 54; instead of this resistance a proper arc-stabilizing inductance may be employed. A volt meter 55 may be employed if desired.

Preferably electromagnetic means is provided to deflect downwardly into a jet like flame the arc struck between the pairs of electrodes 35—36 and 44—45. Any suitable electro-magnet or permanent magnet may be employed for this purpose. In Figs. 2 and 9 I have illustrated one form comprising a C-shaped ferrous core 56 having opposite pole faces 57 and 58 and energizing windings 59—59 having circuit wires 60—60 connected to the circuit of the generator 37 through a switch 61. Upon closing the switch 61, the magnetic flux bridging the pole faces 57 and 58 will effect a downward propulsion of the arc between the electrodes, expanding it into a jet like flame. As shown in Fig. 9, the pole faces 57 and 58 may be disposed laterally spaced from the electrodes to avoid undue heating of the electro-magnet.

A similar arrangement may be provided for the electrodes 44 and 45 energized by the generator 46.

Any suitable means, not shown, may be provided to mount the electro-magnet and the electrodes in a unit to suitably dispose a magnetic field in operative relation to the electrode tips, the diagrammatic showing of Figs. 2 and 9 being believed sufficient in view of the state of development of this art.

In starting up the process and apparatus of Fig. 2, the parts are first disposed generally as illustrated briefly in Fig. 10. The upper portion 63 of the mass of material 31 is absent at the start, and the material is arranged with a substantially horizontal plane 64 thereon. The two pairs of electrodes 35—36 and 44—45 are moved, together with their electro-magnets, over toward the middle portion of the plane 64 and relatively closely adjacent.

The switches 38 and 39 are first closed and an arc is struck between the electrodes 35 and 36 by current from the generator 37. A similar arc is struck between the electrodes 44 and 45 by current from the generator 46. The electro-magnets are then energized by closing their switches 51 and the arcs are deflected downwardly into the mass of material 31.

The switches 51 and 52 are then closed and alternating current flows from the transformer 47 through the electrodes 36 and 44 and establishes arcs flowing through the direct flame arcs, utilizing the latter as conductors. From this time on the alternating current flame arc may be regarded as the main arc and the direct current arcs as the auxiliary or carrying arcs.

A very high temperature is thereby created melting the material 31 in a pool adjacent the electrodes as indicated at 65. The melted material being rendered highly conductive by its high temperature, from this point on serves to conduct the alternating current through the mass thereof, and being heated by the current therein heats and melts more of the mass adjacent thereto, the material melted in this manner collecting in the pool.

The pairs of electrodes are then gradually moved farther and farther apart to the positions illustrated in Fig. 2, the molten pool becoming longer and longer, reaching the extent illustrated in Fig. 2. The upper portion 63 of the material compound may then be added to enclose and thermally insulate the elongated pool 34 and the flow of current may be continued to maintain the temperature of the pool and to melt more of the mass until the desired width and thickness of pool has been obtained.

In starting the alternating current arc, as above described, the pairs of electrodes may be moved sufficiently close so that their respective flame arcs may touch each other and the starting of the alternating current arc will be indicated on the alternating current ammeter 53.

In moving the arcs farther apart, they are maintained close enough to the material being heated to maintain contact therewith.

The electrodes may be such as those hereinbefore described and if electrodes are employed, containing compounds of zirconium, these will further the ionization and assist in maintaining the flame arcs.

A suitable voltage for the direct current generators 37 and 46 is 80 to 150 volts, both generators being equipped with proper voltage regulating means not shown in the Fig. 2; and suitable voltage for the secondary 49 of the transformer 47 is 50 to 350 and more volts, the voltage being regulated on the primary side of the transformer as mentioned hereinbefore.

For either of the processes illustrated in Figs. 1 and 2, considerable quantities of zirconia compounds can be fused and melted in a comparatively short time producing quantities of the compounds for the manufacture of refractory ware.

When the refractory articles or ware are relatively small and of simple form, they may be made by pouring the molten compounds directly into a mold. As an alternative form of production, the molten mass produced by the above described processes is allowed to cool and is then finely pulverized or powdered and mixed with a small amount of water, or with a binder, to render it plastic and then a suitable mold is filled therewith, under pressure or without pressure, to form the article.

As suitable binders, boric acid, boro-glyceride, linseed oil, phosphoric acid, Venetian turpentine, etc., may be used.

The formed article is then removed from the mold and is presintered and finally fired at 2000° to 2400° C. The part of the material, which was rendered vitreous or amorphous, during the melting operation, sinters easier during this last processing and serves as an efficient fluxing binder as has already been explained.

The porosity of the resulting ware or other article is very low, less than 1 percent, and of a hardness almost equal to that of corundum. The porosity can be rendered completely nil and the resistivity and mechanical strength further increased by performing on the finished article a glazing operation if this is desired.

Heretofore, numerous attempts have been made to fuse and melt zirconium dioxide in bulk, but the resulting melts have invariably contained substantial amounts of harmful contaminating substances due to the action of the carbonizing and reducing atmosphere of the furnaces employed and due to direct interaction with the material being melted and the carbon or graphite electrodes, heating tubes, spirals, crucibles and other elements of apparatus employed in conjunction with the furnaces.

By employing the fusing and melting apparatus hereinbefore described, in the form illustrated in Fig. 1, involves the employment of an alternating current arc struck and maintained between special electrodes, and which in the form of Fig. 2 involves the utilization of the conductivity of highly ionized electric arc flames, and maintaining independent electric arcs between them, zirconium dioxide and the several zirconia compounds hereinbefore referred to may be fused and melted substantially without any contamination whatever. In both forms of my invention referred to, the fusing and melting of the compound occurs in a non-reducing atmosphere.

The importance of keeping the zirconium dioxide and its compounds free from contamination cannot be over-emphasized. Pure zirconium dioxide melts at 2700° C., its softening point being only 150° to 200° C. lower and its rate of evaporation very low even at these high temperatures. When used as a refractory at temperatures above 2000° C., a high degree of purity is very essential, since even slight contamination by impurities can be harmful and may considerably lower the melting point.

Most any foreign substance, entering the dioxide or compound, has a lower melting point and a high rate of evaporation at the useful high temperatures encountered such as 2000° C. and higher, and therefore become partly volatilized, and increase the porosity of the material, and may actually form cavities therein. Furthermore, such foreign materials attack the zirconium dioxide or its compound chemically.

Especially is this true of carbon and silicates, which change its molecular structure and possibly produce a partial reduction of the dioxide to lower oxides, or even to the metallic state.

In all of my compounds, therefore, I employ only the purest grade of zirconium dioxide and, as shown hereinbefore, provide means whereby during the fusing and melting operation and any subsequent processing, no appreciable amount of harmful contaminations, such as carbon, iron, silicon and silicates, alumina etc. to which zirconium dioxide and its compounds are particularly susceptible in the unfinished state, may enter the melt or the work.

In prior processes, one of the main sources of impurities introduced into the refractory melts, has been the electrodes used. By employing electrodes either wholly formed from zirconium dioxide, or zirconium dioxide and zirconium, or formed from these materials at least at their arcing portions, contamination from this source is completely eliminated. Furthermore, by carrying on the melting substantially wholly within the mass of the material being melted, contamination from extraneous sources is prevented. In the method illustrated in Fig. 2, the zirconium electrodes described herein may be employed, but if ordinary electrodes of carbon be employed, a practically negligible contamination of the melt may occur at that portion of the mass in immediate contact with the arc; but even with ordinary carbon electrodes, a high degree of purity is attained for that portion of the melts embedded in the mass and deriving its heat solely from the conducted alternating current.

In my copending patent applications Serial Numbers 671,149, 671,150, 671,151, and 671,152, filed May 15, 1933 of which the latter two are now patents, Numbers 2,011,872 and 2,011,873, respectively, I show and describe means whereby exceedingly high temperatures may be produced for carrying out subsequent processes on ware or refractory articles made from zirconium dioxide and the compounds thereof herein described, such, for example, as glazing of the surfaces of the articles or ware, and the depositing of refractory material coatings or layers thereof, and in a manner to prevent the entrance into the compound of the deleterious contaminations herein referred to. Such means, however, form no essential part of the present invention and reference may be had to those applications for a complete description thereof.

The refractory articles and refractory material, which may be produced by the method and means hereinbefore described from zirconium dioxide and its compounds, are susceptible of greatly diverse applications. Among the uses and applications thereof may be cited crucibles, crucible linings, furnace linings, protective coatings for fire bricks; moulds and mould linings; thermocouple protective tubes for pyrometers; refractory ware for laboratories, such as combustion tubes, boats, capsules and shields, flame collars, incinerating and evaporation dishes, filtering discs, plates, crucibles and dishes; household utensils such as pans, pots, jars, plates, casseroles, linings for fireless slow cookers and hot water storage tanks; electrical insulators, especially those for supporting the heating elements in electrical appliances, ovens and furnaces; spark plug insulators; moulds for shaping and sintering or casting of refractory ware made of other substances of lower melting points, such as corundum, silica, quartz, etc.; high temperature (2200° to 2500° C.) furnaces with uniformly heated chambers and oxidizing atmosphere for ceramics, metallurgy and research; linings for combustion chambers, nozzles and buckets of continuous-combustion and explosion turbines; transparent windows for furnaces, combustion chambers, etc., transparent tubes, crucibles, etc., for industrial uses and research, where the application of such parts may lead to important discoveries and improvements.

Apart from the production of refractory material which can be re-processed to form it into articles, linings, ware, etc., as referred to, my invention has an important use in the production of oxides, such as zirconium oxide, in the form of relatively large pieces of glass. By hitherto known methods, zirconium dioxide has sometimes been obtained in a transparent glassy state with a very high index of refraction. It has, however, a very marked tendency toward devitrification which makes it very difficult of production in large pieces. Additions to the zirconium dioxide of some of the other oxides, especially of thorium oxide as above referred to, removes this difficulty. In the latter case, a substantially higher melting temperature is required, since the melting point of the mixture rapidly rises with the increase of the thoria content. The fusing and melting methods herein described, whereby refractory material can be fused and melted in an oxidizing or non-reducing atmosphere substantially without introduction of any appreciable amount of impurities, makes it now quite possible to obtain such glass in large quantities for various important commercial applications.

Apart from these numerous uses in the arts, the improved zirconia compounds are well qualified to be instrumental in processes where a combined application of elevated temperatures and high pressures is a prime requisite, and which may lead to new highly desirable and important products. Among these may be mentioned possible improvements in production of hard metallic compounds of the tungsten alloy type such for example as the tungsten-carbon-cobalt alloy known by the trade-mark "Carboloy" for the making of shaving blades, files, and the production of synthetic carbon and nitrogen compounds, crude oil cracking processes, etc.

My invention is not limited to the exact details of construction shown and described nor to the exact steps of process hereinbefore set forth. Many changes and modifications may be made without departing from the spirit of my invention nor sacrificing its advantages and within the scope of the appended claims.

I claim:

1. The method of fusing and melting a granular and/or pulverized mass of refractory material which includes producing two relatively low voltage direct current arcs between two pairs of electrodes, directing the arcs by respective magnetic fields upon relatively adjacent portions of the mass surface, then establishing two relatively high voltage alternating current arcs, each in one of the direct current arcs and in an electric circuit comprising the alternating current arcs and the portion of the mass therebetween to effect melting portions of the mass into a pool by the heat of the arcs and of the current flowing through the mass between the alternating current arcs.

2. The process of making refractory material from a mass of the material in granulated and/or pulverized form which includes heating the mass to fuse and melt together the components thereof substantially without the introduction of impurities and in a non-reducing atmosphere by producing two direct current arcs between two pairs of electrodes, directing the arcs upon relatively adjacent portions of the mass surface, establishing two alternating current arcs, each in one of the direct current arcs and in an electric circuit comprising the alternating current arcs and the portions of the mass therebetween to effect melting portions of the mass surface into a pool by the heat of the arcs and of the current flowing through the mass between the alternating current arcs, gradually moving the alternating current arcs farther apart to elongate the pool, covering the elongated pool with more of the pulverized material, and continuing the flow of current to continue the melting of more of the material of the mass and of the covering material and accumulating the molten material in the covered elongated pool.

3. The process of melting refractory material containing zirconium dioxide which includes applying thereto the heat of an electric arc supported upon an electrode arc tip composed essentially of zirconium dioxide and zirconium to prevent contamination of the zirconium dioxide, the zirconium being formed in a substantially continuous conducting path for the electrode current.

4. The process of fusing and melting a granular and/or pulverized mass of refractory material including zirconium dioxide which includes preheating a portion of the mass by the heat of an electric arc supported upon an electrode arc tip composed essentially of zirconium dioxide and having zirconium formed therein to provide a substantially continuous conducting path for the electrode current to a temperature sufficient to render it electrically conducting and passing electric current through the conducting portion to further heat it and to effect melting of adjacent portions of the mass, and accumulating the molten portions while continuing the passage of current therethrough.

5. The process of fusing and melting a granular and/or pulverized mass of refractory material including zirconium dioxide which includes preheating a portion of the mass by an electric arc supported upon an electrode arc tip composed essentially of zirconium dioxide and comprising zirconium formed in a substantially continuous conducting path through the electrode for electrode current, to a temperature sufficient to render it electrically conducting and passing electric current through the conducting portion to further heat it and to effect melting of adjacent portions of the mass, and accumulating the molten portions while continuing the passage of current therethrough.

6. The method of fusing and melting a granular and/or pulverized mass of refractory material including zirconium dioxide which includes producing two direct current arcs between two pairs of electrodes composed essentially of zirconium dioxide, directing the arcs upon relatively adjacent portions of the mass surface, then establishing two alternating current arcs upon electrodes composed essentially of zirconium dioxide, each in one of the direct current arcs and in an electric circuit comprising the alternating current arcs and the portion of the mass therebetween to effect melting portions of the mass into a pool by the heat of the arcs and of the current flowing through the mass between the alternating current arcs.

7. The method of fusing and melting a granular and/or pulverized mass of refractory material containing zirconium dioxide which includes producing two direct current arcs between two pairs of electrodes composed essentially of zirconium dioxide and having therethrough a current conducting path of zirconium metal, directing the arcs upon relatively adjacent portions of the mass surface, establishing two alternating current arcs upon electrodes composed substantially of zirconium dioxide and having therethrough a current conducting path of zirconium metal, each alternating current arc in one of the direct current arcs and in an electric circuit comprising the alternating current arcs and the portion of the mass therebetween to effect melting portions of the mass into a pool by the heat of the arcs and of the current flowing through the mass between the alternating current arcs.

8. The method of fusing and melting a granular and/or pulverized mass of refractory material which includes producing two relatively low voltage direct current arcs between two pairs of electrodes, directing the arcs upon relatively adjacent portions of the mass surface, then establishing two relatively high voltage alternating current arcs, each in one of the direct current arcs and in an electric circuit comprising the alternating current arcs and the portion of the mass therebetween to effect melting portions of the mass into a pool by the heat of the arcs and of the current flowing through the mass between the alternating current arcs.

9. The method of fusing and melting a granular and/or pulverized mass of refractory material which includes producing two relatively low voltage direct current arcs, directing the arcs by respective magnetic fields upon relatively adjacent portions of the mass surface, then establishing two relatively high voltage alternating current arcs, each in one of the direct current arcs and in an electric circuit comprising the alternating current arcs and the portion of the mass therebetween to effect melting portions of the mass into a pool by the heat of the arcs and of the current flowing through the mass between the alternating current arcs.

10. The process of making refractory material from a mass of the material in granulated and/or pulverized form which includes heating the mass to fuse and melt together the components thereof substantially without the introduction of impurities and in a non-reducing atmosphere by producing two direct current arcs, directing the arcs upon relatively adjacent portions of the mass surface, establishing two alternating current arcs, each in one of the direct current arcs and in an electric circuit comprising the alternating current arcs and the portions of the mass therebetween to effect melting portions of the mass surface into a pool by the heat of the arcs and of the current flowing through the mass between the alternating current arcs, gradually moving the alternating current arcs farther apart to elongate the pool, covering the elongated pool with more of the pulverized material, and continuing the flow of current to continue the melting of more of the material of the mass and of the covering material and accumulating the molten material in the covered elongated pool.

11. The process of making refractory material from a mass of the material in granulated and/or pulverized form and containing zirconium dioxide which includes heating the mass to fuse and melt together the components thereof substantially without the introduction of impurities thereinto by producing two direct current arcs upon electrodes composed essentially of zirconium dioxide, directing the arcs upon relatively adjacent portions of the mass surface, establishing two alternating current arcs upon electrodes composed essentially of zirconium dioxide, each arc in one of the direct current arcs and in an electric circuit comprising the alternating current arcs and the portions of the mass therebetween to effect melting portions of the mass surface into a pool by the heat of the arcs and of the current flowing through the mass between the alternating current arcs, moving the alternating current arcs farther apart to elongate the pool, covering the elongated pool with pulverized material of like composition, and continuing the flow of current to continue the melting of more of the material of the mass and of the covering material and accumulating the molten material in the covered elongated pool.

12. The process of making refractory material from a mass of the material in granulated and/or pulverized form containing zirconium dioxide which includes heating the mass to fuse and melt together the components thereof substantially without the introduction thereinto of impurities by producing two direct current arcs upon electrodes composed essentially of zirconium dioxide and having therethrough a current conducting path of zirconium metal, directing the arcs upon relatively adjacent portions of the mass surface, establishing two alternating current arcs upon electrodes composed essentially of zirconium dioxide and having a current path therethrough of zirconium metal, each arc in one of the direct current arcs and in an electric circuit comprising the alternating current arcs and the portions of the mass therebetween to effect melting portions of the mass surface into a pool by the heat of the arcs and of the current flowing through the mass between the alternating current arcs, moving the alternating current arcs farther apart to elongate the pool, covering the elongated pool with some of the pulverized material, and continuing the flow of current to continue the melting of more of the material of the mass and of the covering material and accumulating the molten material in the covered elongated pool.

ALEXANDER RAVA.